United States Patent [19]

Spooner

[11] Patent Number: 4,513,380

[45] Date of Patent: Apr. 23, 1985

[54] METHOD OF TOOL RECOVERY IN THREADCUTTING APPARATUS

[75] Inventor: Jerrold C. Spooner, Waynesboro, Va.

[73] Assignee: General Electric Company, Charlottesville, Va.

[21] Appl. No.: 415,508

[22] Filed: Sep. 7, 1982

[51] Int. Cl.³ .............................................. G06F 15/46
[52] U.S. Cl. ..................................... 364/474; 364/475; 82/5; 409/69
[58] Field of Search .................. 364/474, 475; 82/5; 409/69

[56] References Cited

U.S. PATENT DOCUMENTS

| | | | |
|---|---|---|---|
| 3,854,353 | 12/1974 | Cutler | 364/475 |
| 3,878,742 | 4/1975 | Lahm | 82/5 |
| 4,045,660 | 8/1977 | Weisgerber et al. | 364/474 |
| 4,096,770 | 6/1978 | Tanner | 82/5 |
| 4,173,786 | 11/1979 | Kuhnell et al. | 409/69 |
| 4,225,928 | 9/1980 | Ohkubo | 364/474 |
| 4,365,300 | 12/1982 | Johanson et al. | 364/474 |

OTHER PUBLICATIONS

General Electric Company Mark Century 1050T Instruction Book, GEK-45673, pp. 17-18, and GEK-45675, pp. 28-33, Jun. 1977.

*Primary Examiner*—Jerry Smith
*Assistant Examiner*—Louis Woo
*Attorney, Agent, or Firm*—Ormand R. Austin

[57] ABSTRACT

A method for operating a computer controlled industrial machine, such as a lathe, in which a machining operation can be interrupted, a tool displaced from a workpiece and the operation subsequently resumed at the point of interruption. The method includes provision for interrupting canned cycles, such as threadcutting cycles on a lathe, in a manner to prevent damage to any previously cut threads. In one embodiment, the method provides for retrace of prior machining operations before resuming the interrupted operation.

2 Claims, 21 Drawing Figures

Microfiche Appendix Included
(1 Microfiche, 32 Pages)

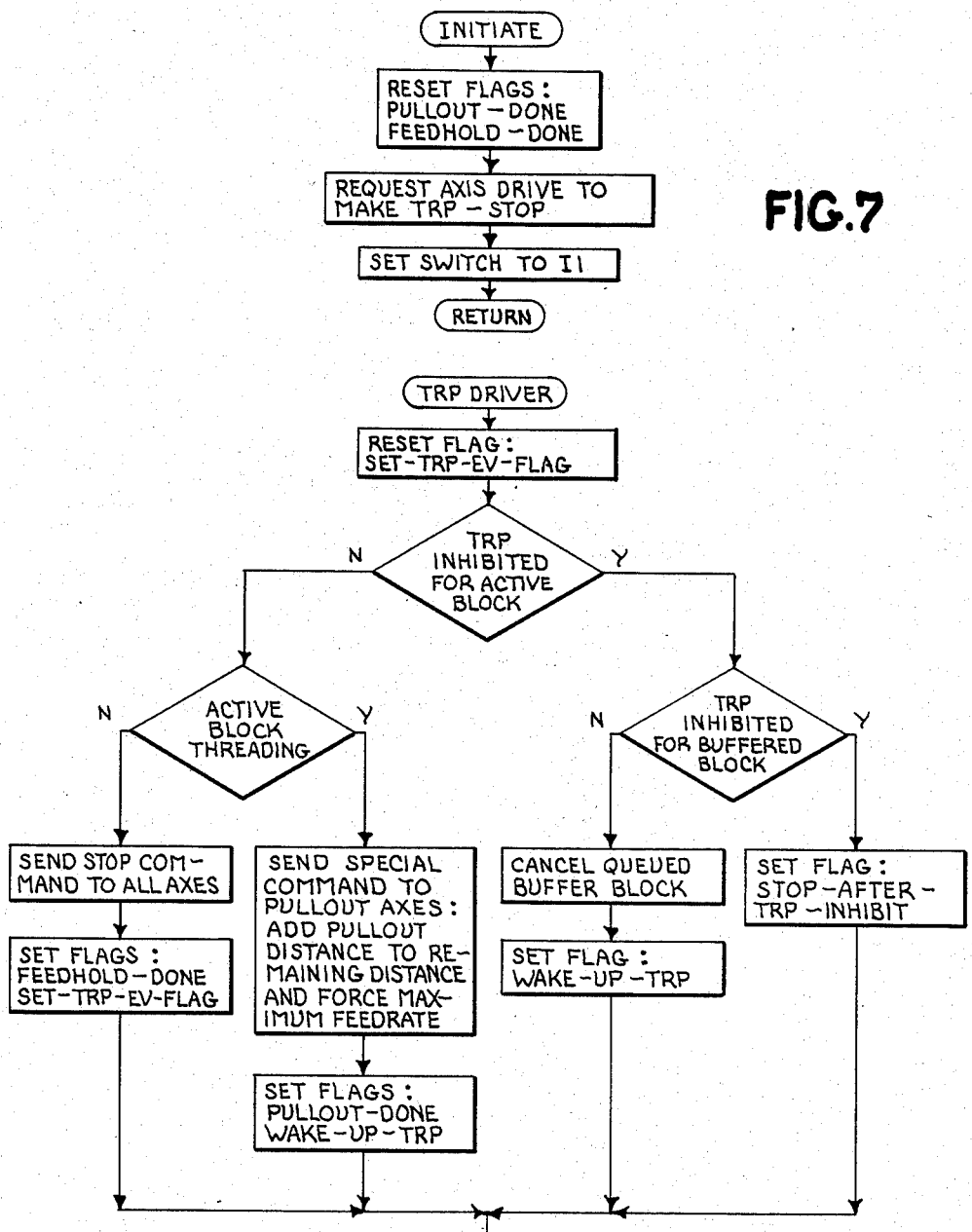

METHOD OF TOOL RECOVERY IN THREADCUTTING APPARATUS

Reference is made to a microfiche appendix forming a part of this application comprising one microfiche containing 31 frames.

BACKGROUND OF THE INVENTION

The present invention relates to computer controlled industrial machines and, more particularly, to a method for interrupting a machine in any phase of its primary operation, performing a secondary operation and returning the machine to the exact location of its primary operation at which it was interrupted.

Industrial machines, which include machine tools such as milling machines and lathes as well as robot devices such as welding machines and material handling machines, are typically controlled by computer numerical control (CNC) systems. These CNC systems incorporate memory units which are programmed to contain a set of instructions defining a precise machining operation to be performed by a machine. In the case of a lathe, the instruction set will define the movement of a cutting tool with respect to a workpiece so as to enable the lathe to machine the workpiece to predetermined dimensions. In the case of a welding robot, the instruction set will similarly define the movement of a robot arm so as to bring the welding head into proper position and then to effect the welding operation.

In the performance of a machining operation it often becomes necessary to interrupt the operation, manually move the controlled tool or arm and subsequently re-initiate the machining operation at the point of interruption or at an earlier point. For example, a typical machining cycle on a lathe might include cutting threads on a workpiece. If a portion of a threadcutting tool were to break during the threadcutting cycle, the threads would not be properly formed. When the broken tool is detected, an operator will interrupt the cycle, manually move the tool holding fixture to a convenient location, change the tool and re-initiate the machining cycle. If the broken tool was not discovered early, i.e., if some threads had been partially formed using the broken tool, it may be necessary to cause at least a portion of some preceding cutting cycles to be repeated. The system must therefore not only have capability for returning to the point at which the machining operation was interrupted but also must be capable of recalling and repeating an earlier portion of the operation.

In the Mark Century® 1050 CNC available from General Electric Company, there is provided a tool inspection procedure which allows a machine operator to move a tool away from a workpiece with an automatic return to the point at which machining was interrupted. This CNC system also includes a retrace feature which permits an operator to have the CNC repeat a limited number of machining steps occurring prior to the point of interruption. However, the tool inspection procedure can only be implemented when machining has been stopped and the retrace function is limited to programmed linear moves. Accordingly, the inspection and retrace features cannot be used in a threadcutting mode. Furthermore, since the tool inspection procedure requires that the tool first be stopped, if such were attempted in a threadcutting mode, the workpiece would be irreparably damaged by "ringing" of the thread.

It is an object of the present invention to provide an improved method for interruption of a machining operation with recovery to the exact point of interruption.

It is another object of the invention to provide an improved method for interruption of a machining operation which can be implemented without initial stoppage of the machining operation.

SUMMARY

The present invention provides a method for interrupting a machining operation while assuring that stopping of a tool does not adversely affect a workpiece. In one aspect of the present invention as applied to a lathe operating in a threadcutting cycle, the CNC system processes a machine interruption command by forcing an automatic withdrawal of a cutting tool from the thread while continuing the primary lead and driving the infeed axis outward from the workpiece at its maximum rate. The system automatically determines when the cutting tool is clear of the workpiece and returns the tool to a predetermined start position. An operator can then manually move the tool to any convenient location and the system will remember the series of moves implemented by the operator. Upon release of the interruption command, the system will return the tool to the predetermined start position. The machining operation will then be reinitiated at the interruption point. Alternatively, the operator can command a repeat of machining operations occurring prior to the point at which the interruption command occurred.

BRIEF DESCRIPTION OF THE DRAWING

For a better understanding of the present invention, reference may be had to the following description taken in conjunction with the accompanying drawing in which:

FIGS. 7-21 are more detailed flow charts illustrating the individual blocks forming the chart of FIG. 6.

DETAILED DESCRIPTION

Figure 1:
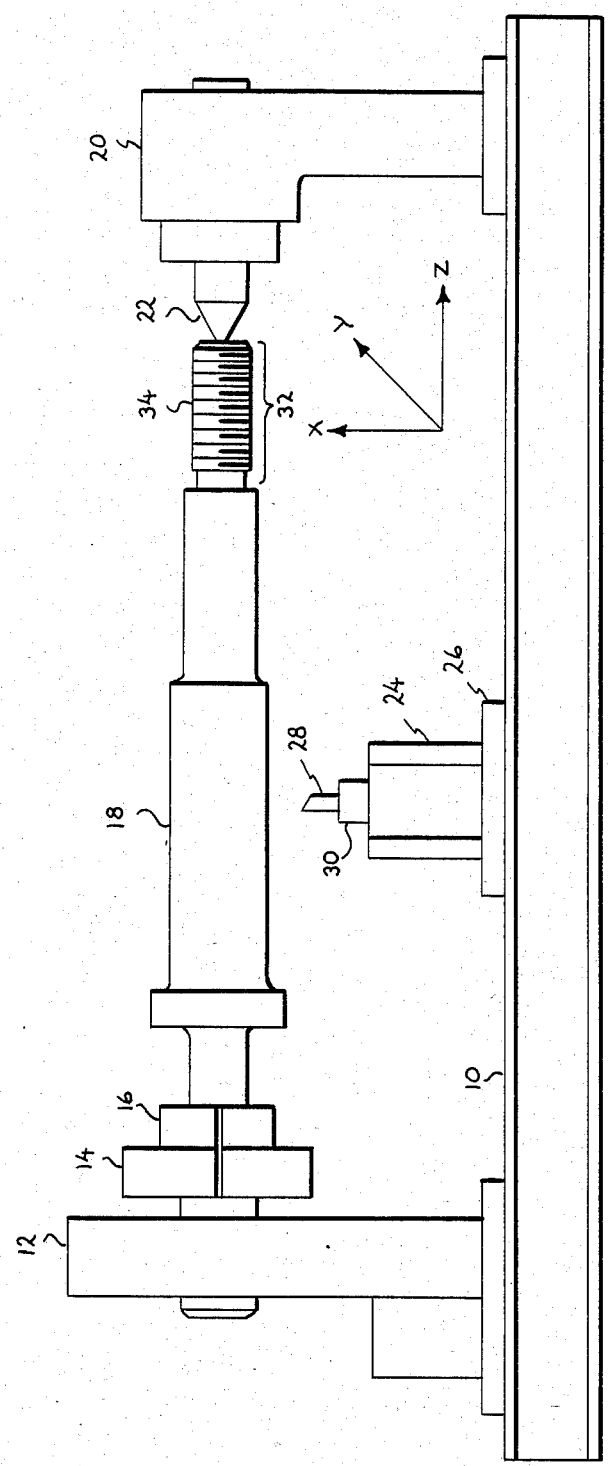
FIG. 1 is a simplified illustration of a lathe.

Referring now to FIG. 1, there is shown a highly simplified view of a machine tool, in this case a lathe, which will illustrate one aspect of the present invention. The CNC, the driving motors and other required elements of an operating machine tool are not shown in this figure. The machine includes a bed 10 upon which is mounted a frame 12 supporting a workpiece holding mechanism or chuck 14. The chuck 14 includes jaws 16 which can be tightened upon a workpiece 18 to hold it in position and, in the case of the illustrated lathe, provide the connection to the driving motors which enables the workpiece to be rotated for machining. While one end of the workpiece 18 is held within the jaws 16, a second end is held against a tailstock 20 and pinned in place by a center 22. The tailstock 20 is also attached to the machine bed 10. A tool holding mechanism 24 is also mounted on the machine tool bed 10. The tool holding mechanism 24 includes a base 26 which allows the mechanism 24 to move parallel to the lengthwise axis of the workpiece 18 and also to move in a direction perpendicular to the workpiece 18. A cutting tool 28 and tool base 30 are mounted in the tool holding mechanism 24. The base 30 is connected to the mechanism 24 in such a manner that it can be raised and lowered so as to bring the cutting tool 28 into contact with the workpiece 18.

A portion of the workpiece 18 is shown as being provided with screw threads 34, such threads having been cut into the workpiece 18 by repeated passes of the tool 28 along the portion 32 while workpiece 18 is being rotated. As will become apparent, one of the features of the present invention is the ability to interrupt a thread cutting cycle while the tool 28 is cutting a thread without damaging the threaded portion 32. For example, if a tip of the tool 28 becomes chipped, it is necessary to interrupt thread cutting in order to change the tool 28. If the machine power is interrupted by use of a power-off switch, the loss of synchronization between drive in the Z-axis direction and rotation of workpiece 18 will cause the tool 28 to cut a "ring" on the portion 32 and perhaps irretrievably damage the threaded portion.

Figure 2:
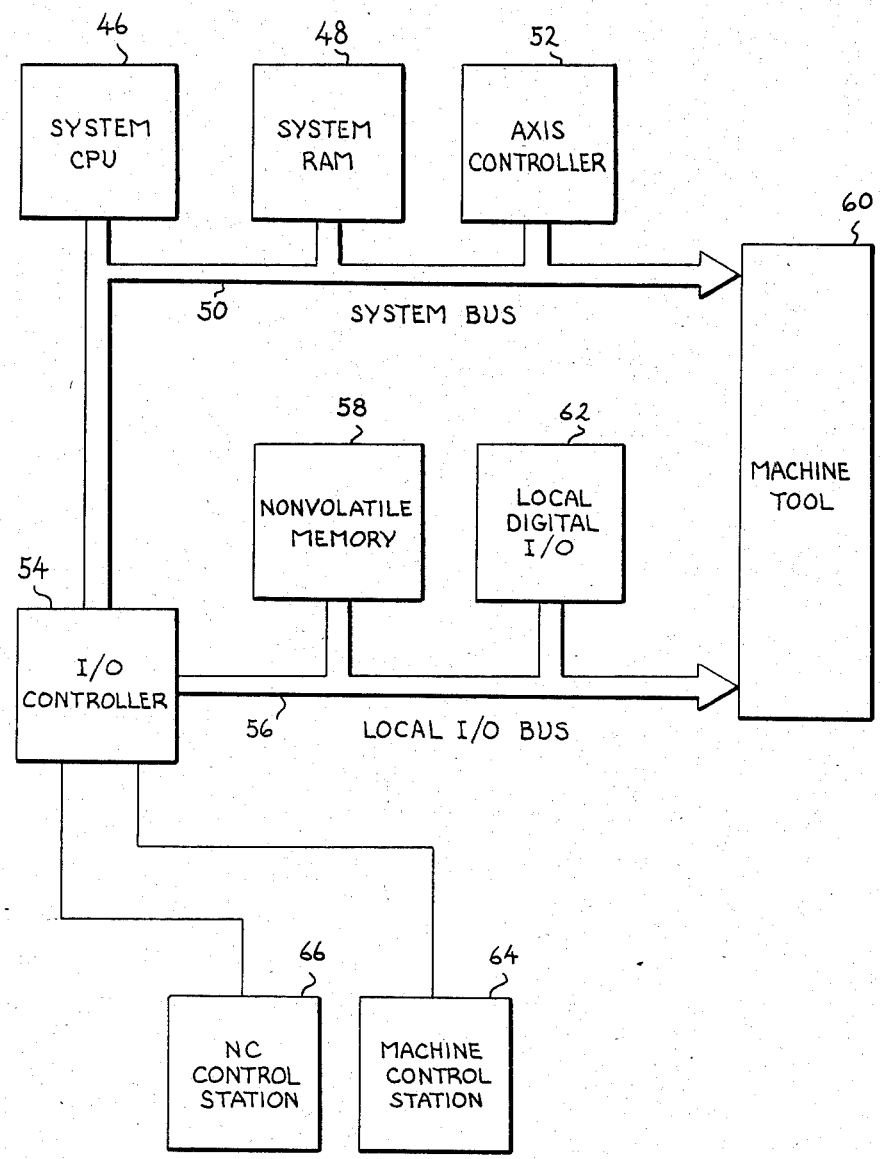
FIG. 2 is a simplified partial block diagram of a CNC system for implementing the present invention.

As noted previously, the present invention is particularly adapted for use with a computer numerical control (CNC) in which the positioning of the cutting tool 28 with respect to the workpiece 18 is defined by a part program operating within the CNC. As is well known, part programs are divided into command blocks or work statements wherein each block of information within a part program defines a unidirectional movement of the machine cutting tool 28 with respect to the workpiece 18. However, there are certain moves, such as circular arcs or thread cutting cycles defined by "canned cycles" which can be called by command blocks within the part program. Although the method of operating a machine tool system in accordance with the present invention is applicable with any type of CNC, the implementation disclosed herein is particularly applicable for use with the Mark Century ® 2000 CNC available from General Electric Company. The Mark Century 2000 CNC is a microprocessor based control unit employing Intel 8086 and 8087 microprocessors. The hardware architecture for the Mark Century 2000 CNC is shown in FIG. 2. A system central processing unit (CPU) 46 performs processing operations for the system and contains the Intel 8086 and 8087 microprocessors. A system dynamic RAM 48 (ramdom access memory) contains read-write memory for the system and is coupled to the system CPU and other functional portions of the system through a system bus 50. An axis controller 52 connected to the bus 50 provides several control functions for each driven axis of the machine tool. The axis controller contains its own microprocessor (not shown) which serves as a front end processor to interface a coordinated group of motion axes of a machine tool 60 to the system bus 50 while other processors within the controller 52 perform computations for the controlled axes.

An input-output (I/O) controller 54 coordinates system bus I/O operations and thus serves to connect the system bus 50 to a local I/O bus 56. The local I/O bus 56 connects the system to a non-volatile memory 58 in which the part programs and all system data which must be preserved are stored. The local I/O bus 56 also is connected to a local digital I/O 62. The local digital I/O 62 generates digitized actuator control signals for the machine tool 60 and provides feedback status data from the machine tool 60.

An NC control station 66 is also connected to the I/O controller 54. The NC control station 66 serves as a front panel to machine tool operators and part programmers. The machine control station 64 is a control panel from which the machine tool operator can perform manual operations and control the execution of the part programs.

The CNC illustrated in FIG. 2 operates under control of the system CPU 46 executing programs resident in the system ram 48. Part programs may be input from an external device such as a paper tape or cassette reader through the I/O controller 54 or through the keyboard of the NC control station 66. Any part program which is input to the system is stored by the I/O controller 54 into non-volatile memory 58. The system CPU 46 directs the execution of other part programs through the I/O controller 54 and the axis controller 52. Part programming axis commands are executed through the axis controller 52 which is connected to the machine tool 60, such as the lathe illustrated in FIG. 1. The machine tool 60 contains axis feed drives which are under control of the axis controller 52. Non-axis commands are executed through the I/O controller 54, connected to the machine tool 60 through the local digital I/O bus 56. Commands entered with pushbuttons and controls on machine control station 64 are communicated to the I/O controller 54 and finally to the machine tool 60 through either the axis controller 52 or the local digital I/O bus 56.

As is well known, a CNC, as with most other computer control systems, has evolved from a hardwired system into essentially a computer architecture which is customized into a firmware control system through the use of software. Computer programs, i.e., software, provide the method for reconfiguring each of these computer systems into a system equivalent to those earlier hardwired systems. The method disclosed in this application is thus configured in the form of a computer program which forces the hardware system illustrated in FIG. 2 to operate in a particular fashion in order to implement the improved method.

Figure 3:
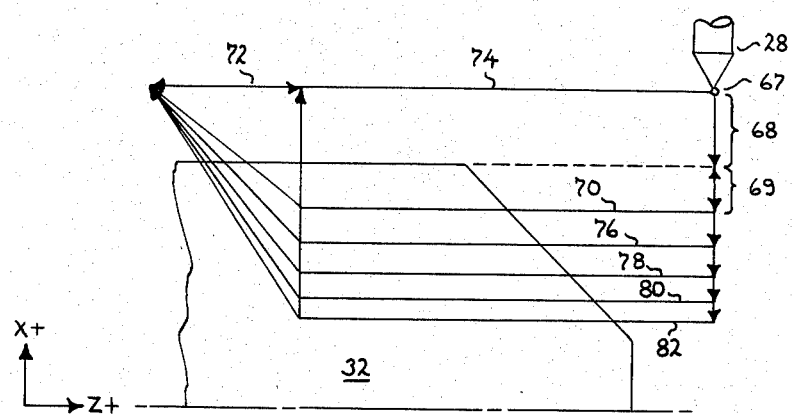
FIG. 3 is a partial illustration of a machining pattern for threadcutting.

Referring now to FIG. 3, there is shown an expanded view of the threaded portion 32 of the workpiece 18 of FIG. 1 illustrating the path of the cutting tool 28 in cutting threads 34. At the beginning of a threadcutting cycle, the cutting tool 28 is positioned at a cycle start point 67 a predetermined offset distance 68 from the surface of the workpiece 18. The offset distance 68 is set by the machine tool manufacturer and is typically two millimeters above the surface of a workpiece. In establishing a threading cycle, the programmer must establish the total depth of the thread and a first infeed depth 69 for a first thread cut in the cycle. The CNC then calculates the infeed depth for each subsequent pass of the tool 28 in cutting the threads 34. Normally the infeed depths are computed so as to make each pass remove an equivalent amount of material. Since for each pass the tool will remove larger amounts of material with the sides of the cutting surface, each pass will have a slightly smaller depth than the previous pass. In the threading cycle illustrated in FIG. 2, the tool 28 makes a first pass by moving towards the workpiece 18 a distance equal to the offset distance 68 plus the first infeed distance 69. The tool 28 is then fed along the Z axis following the path 70 for the length of the thread. At the end of the thread the tool 28 may be programmed to either pull directly out of the thread or, as shown in FIG. 2, to pull out at a slight taper. The pullout distance 72 along the thread may be selected as desired. After the tool has pulled out from the thread, it then traverses back to the start point of the cycle following the path 74 and then again plunges to the required depth for the next pass. The depth at this second pass is the depth of the first pass plus the additional depth computed by the CNC for removal of an amount of material equal to the amount removed in the first pass. Each of the subsequent passes necessary to cut a thread to the required depth are illustrated by the tool paths 76, 78, 80 and 82.

Figure 4:
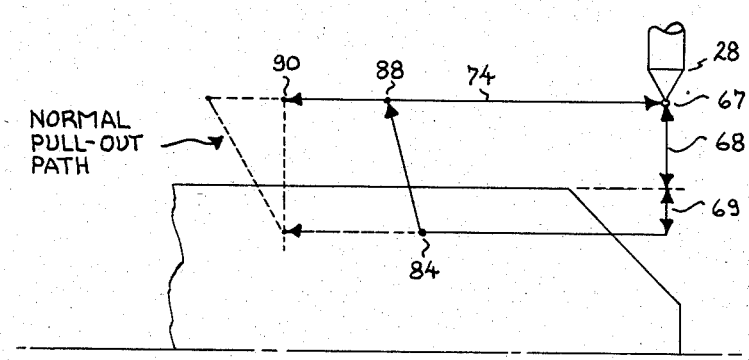
FIG. 4 is illustrative of a typical tool pull-out procedure using the present invention.

Referring now to FIG. 4, there is shown an operation in which the inventive tool recovery program (TRP) function is utilized. FIG. 4 is essentially identical to FIG. 3 except that only one pass of the tool 28 on the workpiece 18 is shown. As described before, the tool 28 moves through the distance 68 plus the first infeed depth, 69 to make a pass along the axis of the workpiece 18 in order to cut a thread. For purposes of illustration, it will be assumed that at the point 84 a malfunction such as a broken tool tip was detected and the tool recovery function was implemented. As can be seen, the tool 28 immediately retracts from the workpiece at a high rate. The drive of the tool 28 along the Z axis of the workpiece 18 is continued so that the retract direction forms a taper thread on the workpiece 18. The tool recovery function forces retraction to a point 88 coincident with the traverse line 74 utilized in the threading cycle. From the point 88 the tool 28 is driven along the Z axis as though retraction had not occurred until the tool 28 reaches a point 90 corresponding to the end point of the thread 34. The tool 28 is then returned to the start point 67 of the threading cycle and all motion is halted. The machine tool operator is then able to manually move the tool away from the workpiece 18 to any desired location suitable for inspecting the tool tip. The control will remember the path utilized by the operator in moving the tool 28 from the cycle start point 67 to the point at which tool inspection can occur.

Since it is possible that the tool tip may have broken at some time prior to the point 84, it may be necessary for the tool 28 to be forced through portions of the thread cutting cycle which were previously performed. In an automatic thread cutting cycle, the CNC can be programmed to automatically move the tool 28 back to the cycle start point 67 after a tool has been changed and then to initiate thread cutting at some pass earlier than the pass at which TRP was initiated. In a manual thread cutting mode wherein the operator is actually programming each pass, the operator may initiate a retrace function which will force the tool 28 to begin the thread cutting function at an earlier point as determined by the operator.

Figure 5:
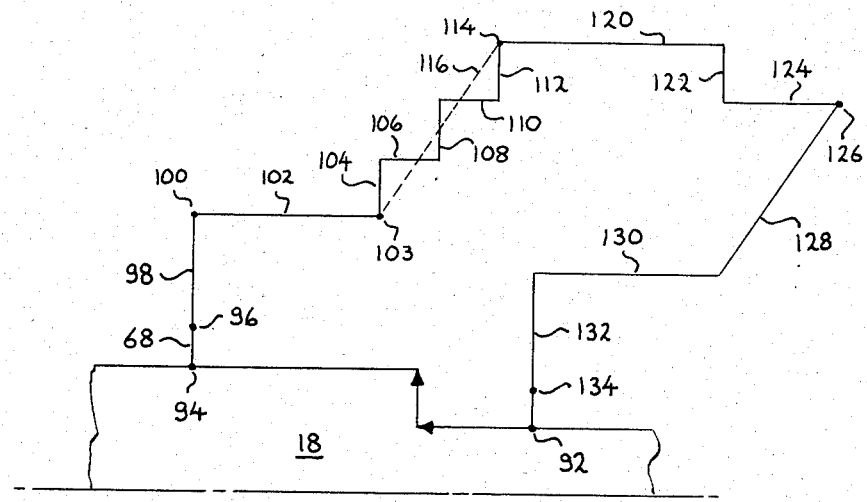
FIG. 5 is an illustration of a retrace pattern after pull-out.

Referring now to FIG. 5, there is shown an example of a retrace function in which the machine operator has moved the tool 28 away from the workpiece 18 and then wishes to begin or reinitiate cutting at a point 92 ahead of a point 94 at which the TRP function was initiated. For purposes of description, the tool paths shown are those for cutting a stepped portion of the workpiece 18 rather than the threaded portion 32. When the tool recovery function is initiated, the tool 28 immediately retracts from the surface of workpiece 18 to a point 96 which is located at a distance equal to the offset distance 68 from the workpiece surface. Since this is not a threading cycle, the tool 28 can retract perpendicularly to the workpiece. The operator may then manually move the tool 28 along a path 98 away from the workpiece 18 in an X-axis direction to a point 100. A manual move in a second or Z-axis direction along the path 102 to a point 103 may then be initiated in order to move the tool 28 towards a better location for inspection. If it thereafter becomes necessary to jog the tool in several different directions in order to position in an adequate location for changing the tool, a path such as that illustrated by the lines 104, 106, 108, 110 and 112 may be followed to the point 114. If the operator then releases the TRP function after changing the tool at the point 114, the tool will make a vectorial move following the path indicated at 116 to the last location (point 103) at which the second axis move 102 was terminated. The tool would then follow exactly the move along the path 102 and along the path 98 back to the operation interruption point 96. However, if while at the point 114, the operator desired to retrace certain earlier cuts, the tool might be moved along the path 120, 122 and 124 to the point 126. The paths 120, 122 and 124 follow the profile of the workpiece 18 as set forth in the data command blocks which the operator has chosen to retrace. If the TRP and retrace function is then released at the point 126, the tool 28 will move along the paths 128, 130 and 132 back to a cycle start point 134. The paths 128, 130 and 132 correspond to and are parallel to the paths 116, 102 and 98. When machining is thereafter restarted, the tool 28 advances to the point 92 and repeats the data blocks which the operator has commanded to be repeated.

Figure 6:
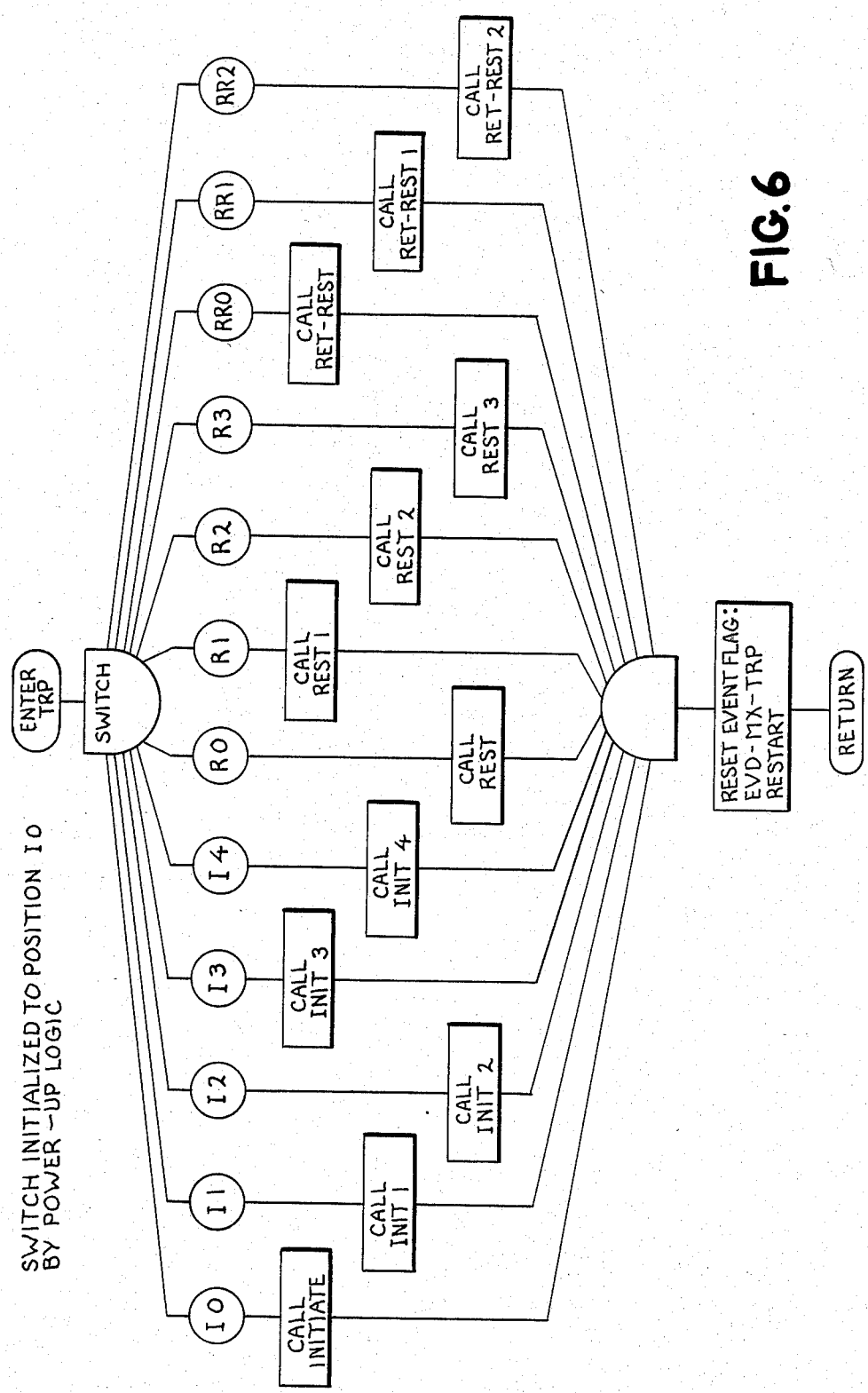
FIG. 6 is a flow chart illustrating one form of the present invention.

Referring now to FIG. 6, there is shown a high-level flow diagram of the inventive tool recovery program function as implemented in a preferred form, i.e., implemented in software to be run in a CNC. The TRP program is initially entered by an operator command such as by depressing a TRP button (not shown) in order to activate the function. The TRP function is comprised of a plurality of subroutines which are called in sequence from a TRP switch logic. The system initialization forces the switch logic to be set so that the IO subroutine is called first, i.e., the system software provides a command to set the TRP function at an initial condition. Each of the subroutines forming the TRP function sequentially sets a flag after it has been run, which allows the next succeeding subroutine to be called. A timing and synchronization function actually calls the TRP function and the switch logic and the TRP function senses the flag for each of the subroutines making up that function.

The action to be taken in response to a TRP function request is different for different kinds of motion command blocks occurring under different circumstances. It is essential, therefore, that the portion of the TRP function that deals with stopping machining motion or withdrawing a tool from a threading motion or continuing the programmed lead in the primary threading axis be accomplished during a period of time when the system cannot initiate a new motion block that might be of a different type. During the TRP function sequence, there may be other on-going functions involving a MANUAL AXIS CONTROL task, from which the TRP function is activated. Since the total TRP function sequence also includes delays for a number of reasons, the successive phases of the TRP functions must be operated from a switch, with control always being returned to the MANUAL AXIS CONTROL task during delays. The ENTER TRP procedure accomplishes the switching action and is the primary entry point for the TRP functions. The ENTER TRP procedure is called whenever a TRP command is queued by the machine control logic, i.e., TRP ON or TRP OFF, or when FEEDHOLD is released if FEEDHOLD was on during the termination sequence or when the MANUAL AXIS CONTROL task finds the TRP RESTART event flag set in the manual event flag group.

The TRP ON function in the machine control logic (MCL) library will call the system software manager program which will make some basic interlock decisions concerning stopping of the servo drives and zeroing of the servo positions and will return a boolean value to the MCL for use in turning on the TRP light. If conditions permit activation of TRP, the software manager will call a TRP ON routine (ADR-TRP ON) which will set TRP active and an event flag to activate the MANUAL AXIS CONTROL task. The MANUAL AXIS CONTROL task will call the ENTER TRP procedure which will perform the necessary actions to retract the tool from the workpiece if there is a defined retract action or simply stop if there is no defined retract action. In the case of threading, not in a canned cycle, if there is no defined retract direction and distance, the stop will occur at the end of the threading block or series of blocks, because TRP INHIBIT will have been set for such blocks.

Referring again to FIG. 6, as was mentioned previously, when power was first applied to the system, the TRP function is initialized such that whenever ENTER TRP occurs, IO is set and the control switch directs that the TRP INITIATE procedure be performed first. The TRP INITIATE procedure performs some local housekeeping then sends an I/O request to the driver for a TRP STOP. The servo driver, at the appropriate time, calls TRP DRIVER which can take one of four actions:

(1) if TRP INHIBIT is set for both the active block and the block in the buffer, it sets a global flag, STOP AFTER TRP INHIBIT, requesting the BLOCK SYNC task to stop when a block is found for which TRP INHIBIT is not set.

(2) If TRP INHIBIT is set for the active block but not for the block in the buffer, it resets the buffer ready bit to cancel the buffer block, and sets another global flag to request BLOCK SYNC to reactivate TRP when the current block is done.

(3) If TRP INHIBIT is not set for the active block but the active block is a thread cutting block, it writes pull-out data to the board and forces a special transfer which adds the supplied distance to the distance to go, sets the lead for the pull-out axis to maximum value, and blocks the feedback of ERROR LIMIT from the forced axis to the other axes. It then sets TRP PULLOUT DONE.

(4) If none of the above situations exist, TRP DRIVER sends a feedhold command to axis group 1 and sets TRP FEEDHOLD DONE.

When the driver action has been completed, the remaining logic associated with each possible situation can be accomplished somewhat more at leisure. Flags and data from the active record are tested and used to complete the TRP initiation functions. When delays are required, the switch logic is invoked and when retract action is completed, the software manager is called with the input TRP RETRACT DONE and the switch is set to resume TRP functions.

The initiation sequences or procedures for the TRP function include TRP INITIATE, TRP DRIVER, TRIP INIT 1, TRP INIT 2, TRP INIT 3 and TRP INIT 4. The TRP INITIATE does the initial housekeeping, makes an I/O request, and sets the switch to TRP INIT 1. The TRP DRIVER functions as a part of the axis servo driver control to perform the time critical functions of TRP relating to stopping the axis and/or pulling out of the thread. The logic for this function is at a high level in order to insure that the correct action is taken upon the active block. The TRP INIT 1 procedure is entered after a TRP STOP request has been serviced by the TRP DRIVER. TRP INIT 1 determines what the circumstances were at the time of stopping and initiates the proper sequence to be followed. TRP INIT 2, TRP INIT 3 and TRP INIT 4 carry out the remainder of the sequence identified by TRP INIT 1. The latter functions are required in order to allow other manual functions to occur during TRP. At the end of the TRP INIT sequence, the system software manager is called with the input TRP RETRACT DONE, thereby indicating that the tool has been retracted from the workpiece.

When the TRP function has been released, the MANUAL AXIS CONTROL task will call ENTER TRP, which will switch control to the TRP RESTORE procedure to build and transmit to the axes a series of moves to return the tool to the retract point at traverse speed. The data from which these blocks are derived are to be accumulated by the jog and incremental motion functions and other manual axis control tasks. After returning the tool to the retract point, TRP RESTORE will call the system software manager with the input TRP RESTORE DONE. The software manager will force a feedhold condition. When the machine tool operator releases the feedhold, the software manager is again called at which time the TRP function is again activated to enter the TRP RETRACT RESTORE procedure which will return the tool to the work in one or two moves. Referring briefly again to FIG. 5, it will be noted that the procedure TRP RESTORE DONE returns the tool to the point 96. The final procedure TRP RETRACT RESTORE DONE then returns the tool to the point 94 at which it is in contact with the workpiece. If the total retract distance is larger than the specified offset distance, a traverse move to the specified distance will be made, followed by a final move at the current program feed rate. When the tool has been returned to the programmed path, the TRP RETRACT RESTORE procedure builds and queues a block to resume the motion which was interrupted and calls the software manager with the input TRP RETRACT RESTORE DONE. The software manager then switches the processing back to normal program execution and the subsequent action depends upon the current state of the control. If the retract distance had been zero, the portion of the last move of the restored sequence (the first operator move) would be treated as if it had been a retract move.

The procedures used during restoration, i.e., returning of the tool to the point at which the machine was interrupted, include TRP RESTORE, TRP REST 1, TRP REST 2, TRP REST 3, TRP BUILD MOVE, TRP RETRACT RESTORE, TRP RET REST 1 and TRP RET REST 2. Each of these procedures is described briefly below.

TRP RESTORE tests for any manual moves to remove the tool from the workpiece. If any moves are detected, TRP RESTORE generates and queues a first vectorial move of the return sequence. If there are no manual moves, the flag TRP RESTORE DONE is set and the entry switch is set to execute the TRP RETRACT RESTORE sequence next. The vectorial move may be a null move but it will be processed and transmitted by the procedure.

TRP REST 1 (TRP RESTORE) tests for more than one single axis move. If there is more than one move, the next move is output. If only one move is detected, the move remaining is the last of the sequence that returns the tool to the retract point. If there was no retract move, the last single axis move is checked against the specified offset distance. If the last single axis move is greater than the retract offset distance, the excess distance is output as a traverse move and the remaining portion is saved as a retract move.

TRP REST 2 tests whether there was a retract move. If no retract move occurred, the entry switch is set to run TRP REST 3 upon next entry. If there was a retract move, the switch is set to TRP RETRACT RESTORE sequence. In either case, the software manager is called with the input TRP RESTORE DONE.

TRP REST 3 is utilized only if there was no retract move. This sequence outputs the last single axis move (or the last part of the last move) at programmed feed rate. The procedure then sets the switch to execute TRP RET REST 0 next.

TRP BUILD MOVE is a utility subroutine called by TRP REST 1 and TRP REST 3 to build and queue a block of data from an array of single axis move data.

TRP RETRACT RESTORE tests whether a retract move was done. If no retract move occurred, it calls TRP RET REST 2. If there was a retract move, the retract move is checked against the minimum offset value for the past return move. If the retract move is larger than the minimum offset distance, the excess distance is output at traverse speed and the switch is set to execute TRP RET REST 1 next. If the retract move does not exceed the minimum offset distance, then TRP RET REST 1 is called directly.

TRP RET REST 1 outputs the move which restores the tool to the program path and sets the switch so that TRP RET REST 2 will be executed next.

TRP RET REST 2 builds a motion block (a resume block) from data in the record on the top of the retrace queue in the present position. The procedure then queues that block for execution, sets the switch to TRP INITIATE and calls the software manager with input TRP RETRACT RESTORE done.

BLOCK SYNC is a program task which performs selected housekeeping functions related to the control data passing to the axis driver boards. Since a TRP function requires that motion data be sent to the axis board, the BLOCK SYNC task must be activated in order to convert the data to proper form and to transfer the data from a storage location to the axis board.

As will become apparent from the flow charts associated with each of the subroutines described above, once the tool has been returned to the point at which the TRP procedure was initiated, the TRP function is reset to the IO position so that on subsequent calls the function will again begin operation with the TRP INITIATE sequence.

Referring now to FIG. 7, there is shown an expanded flow chart for the TRP INITIATE routine. The first step in the sequence is to reset a PULLOUT DONE and FEEDHOLD ON flags to the proper state so that subsequent steps can determine whether or not PULLOUT and FEEDHOLD have actually been performed.

The INITIATE sequence then sends a request to the axis driver to make a TRP STOP. When the axis driver processes the TRP STOP request, it will call the TRP DRIVER sequence which functions as part of the axis driver although packaged with the TRP function. The last function for the TRP INITIATE routine is to set the switch to the I1 or INIT 1 routine.

The procedure entitled TRP DRIVER which is called by the axis driver when the TRP STOP command is generated by the INITIATE routine is built with extremely fast logic since it operates at the logical level of the driver and interrupts are inhibited. The routine must be operated at this level in the system in order to insure taking the correct TRP action. The same record must remain active during the initiation of TRP unless TRP is inhibited for the active block, and the action then depends upon the buffer block. Furthermore, the routine must write information directly to the axis board rather than process it through the normal axis driver channels.

Referring now to FIG. 8 there is shown a flow diagram for the TRP DRIVER task. When TRP DRIVER is called, it first resets SET TRP EV FLAG. This flag is used later in the routine after a stop command has been sent to all axes. The TRP DRIVER first checks to determine whether or not TRP has been inhibited for the block of machine tool data which is being performed. If TRP is inhibited for the active block, the task also determines whether or not TRP is also inhibited for the next upcoming block of machine data i.e., the buffered block. If both the active and buffered block have a TRP INHIBIT, the routine simply sets the flag STOP AFTER TRP INHIBIT and returns to the main program. If the active block is inhibited but the buffered block is not inhibited, the buffered block is cancelled and the wakeup TRP flag is set. If, however, the active block does not include a TRP INHIBIT, then the task must determine whether a thread cutting cycle is being performed. If threads are not being cut, then a STOP command is sent to all the axes and the FEED HOLD ON and SET TRP EV flag is set. If a thread cutting cycle is now being performed, a special command sent to the pull-out axis to add a pull-out distance to the remaining distance to be processed in this block and to force the maximum feed rate. The PULLOUT DONE and WAKEUP TRP flags are then set.

Figure 9:
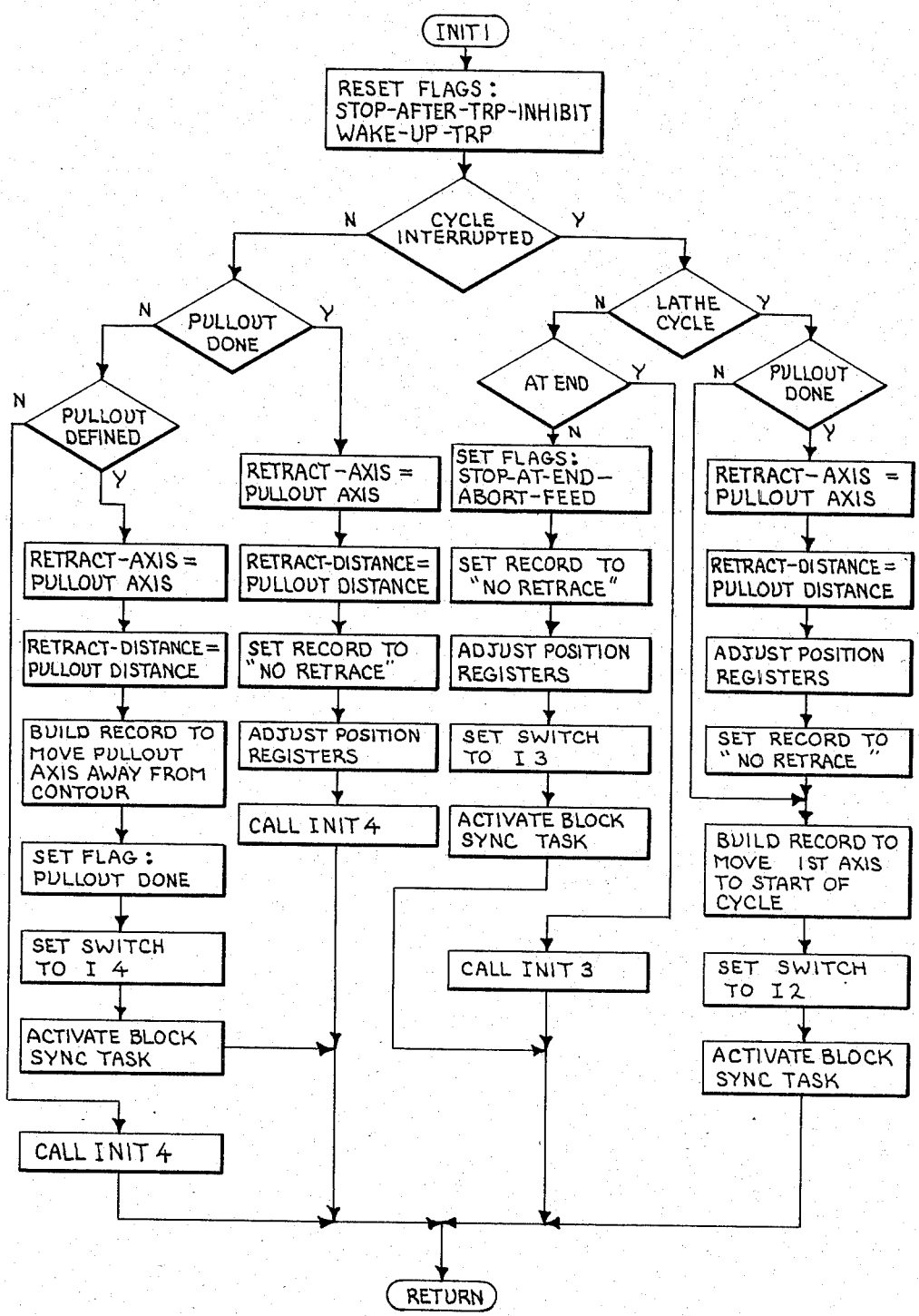

FIG. 9 is a more complete flow chart for the INIT 1 task and illustrates that there are four possible procedures for this subroutine to follow depending upon the actual motion command which is being processed at the time that TRP function is called. Seven different sets of conditions have to be considered. If the control was not in a cycle, e.g., a thread cutting cycle, a pullout was not done and a pullout was not defined, then the subroutine TRP INIT 4 is called directly. If the control was not in a cycle, a pullout was not done but a pullout is defined, then a motion record is built to move the pullout axis away from the workpiece. The TRP switch is set to I4 (INIT 4) and the BLOCK SYNC task is activated. If the control was not in a cycle, but a pullout was done, then the position registers kept by the software must be updated to reflect the pull-out motion and then TRP INIT 4 is called directly. If the control was in the middle of a machining type canned cycle and the cycle has not completed, then the flags STOP AT END and ABORT FEED are set for the BLOCK SYNC task, the position registers are adjusted to reflect the current position, the switch is set to TRP INIT 3 (I3) and the BLOCK SYNC task is activated. If the control was in a machining center cycle but the cycle is now complete, then TRP INIT 3 is called directly. If the control was within a lathe canned cycle and a pullout was not done, a record is built to move the first axis to the position of the start of the cycle. The TRP switch is set to I2 and the BLOCK SYNC task is activated. Finally, if the control was in a lathe cycle and a pullout was done, the position registers must be adjusted to reflect the pull-out distance and a record must be built to move the first axis to the start of the cycle. The switch is set to position I2 and BLOCK SYNC task is activated.

Figure 10:
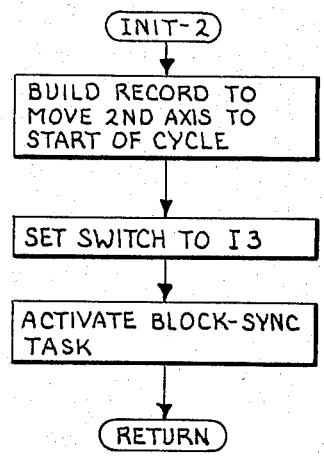

Referring to FIG. 10, the subroutine TRP INIT 2 builds a record to move the second axis to the start of the cycle, sets the TRP switch to I3 and activates the BLOCK SYNC task.

Figure 11:
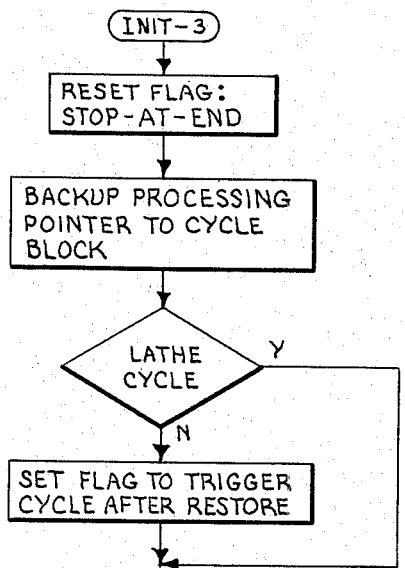
Figure 12:
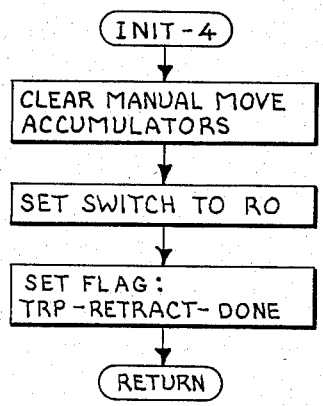

FIG. 11 illustrates the subroutine TRP INIT 3 which performs some necessary housekeeping tasks and clears a set of manual move accumulators which are used to record the operator's manual motion of the machine during TRP ACTIVE. It then sets the TRP switch to position R0 and sets a flag TRP RETRACT DONE. The subroutine TRP INIT 4 shown in FIG. 12 clears the manual move accumulators, sets the TRP switch to R0 and sets the flag TRP RETRACT DONE. Note that the main difference between INIT 3 and INIT 4 subroutines is that INIT 3 requires that the processing pointer be moved back to the start of the "canned cyle" and is therefore called only when a preset cycle is interrupted by TRP.

In the Mark Century 2000 CNC, the TRP restoration sequence begins when the operator depresses the TRP button for a second time indicating that he wants to cancel TRP. This action will cause the subroutine ENTER TRP to be called again with the switch now being in the position R0.

Before discussing the total process of returning the tool to the workpiece after it has been moved to a convenient location for inspection or a tool change, consider again the RETRACE function described with respect to FIG. 5. The RETRACE function may be used to back the machine axis through a number of blocks of a part program. RETRACE is useful in the case of a broken tool since several moves of the tool may be necessary to position it in a convenient location to change the tool. When the retrace function is activated, and this may occur at any time after an axis has been moved, the machine backs up to the start of the active or just completed part program block. An automatic retrace mode may be provided wherein the machine will continue to back up through a predetermined number of blocks. If RETRACE is released in the middle of a block, the motion stops and the RETRACE indication light will go out. When the TRP function is subsequently released, the CNC will process the part program blocks to be retraced in a normal manner, thereby retracing over a path which the machine tool should have previously followed.

Figure 13:
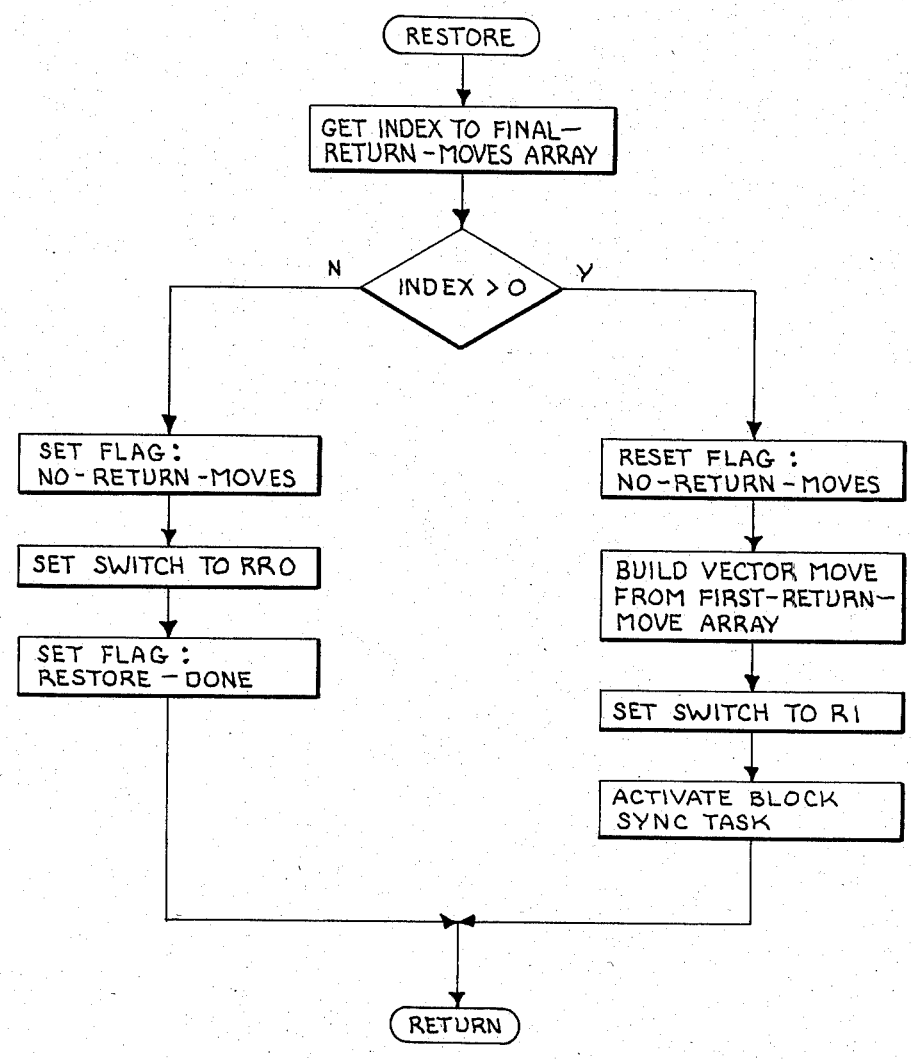

Referring now to FIG. 13 there is shown an expanded flow chart for the RESTORE routine. This routine determines whether there are any return moves which have to be processed. Each operator initiated move changes an index value in a FINAL RETURN MOVES ARRAY. The RESTORE routine checks the index value in the FINAL RETURN MOVES ARRAY. If the index value is zero, then no moves were made and the flag NO RETURN MOVES is set, the switch is set to RR0 (RETRACT RESTORE 0) and the flag RESTORE DONE is set. If the index value is greater than zero, then the flag NO RETURN MOVES is placed in a reset condition, a vector move is built from move data accumulated in a FIRST RETURN MOVE ARRAY and the switch is set to the R1 position. BLOCK SYNC task is activated so that the R1 subroutine can be called.

Figure 14:
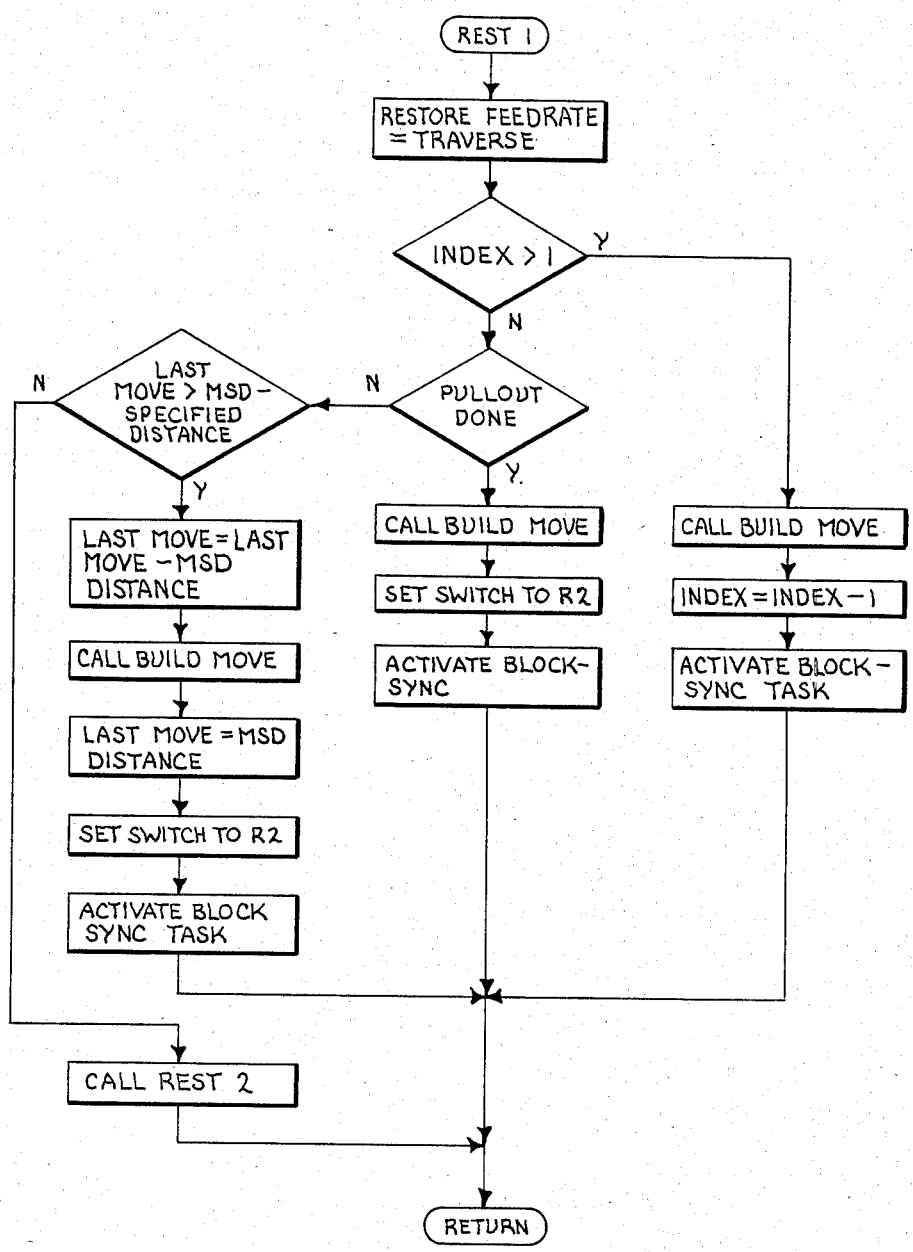

FIG. 14 illustrates the first restore sequence REST 1 which is utilized whenever the tool has been moved away from its normal machining position. The routine first sets the feed rate to traverse speed so that the tool can be rapidly returned to the minimum offset position. If more than one move has been made, i.e., the index value is greater than one, then the BUILD MOVE routine is called, the index value is counted down and the BLOCK SYNC task is activated. If the index value is one or less and the pullout was done, for example from a thread cutting cycle, then BUILD MOVE is also called, the switch is set to R2 and BLOCK SYNC is activated. If no pullout was done and the last move was less than or equal to the minimum specified offset distance, then REST 2 is called directly. If the last move is greater than the minimum offset distance, then the last move is set equal to the last move less the minimum offset distance and the BUILD MOVE routine is called. Thereafter the last move is set equal to the minimum offset distance and the switch is set to R2 and BLOCK SYNC task activated.

Figure 15:
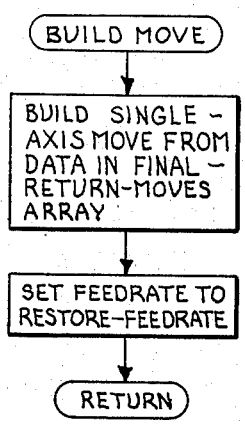

Before continuing the restore sequence, reference is now made to FIG. 15 in which the BUILD MOVE routine is illustrated. This routine builds a single axis move from the data found in the FINAL RETURN MOVES ARRAY at the position indicated by the index value. The routine then sets the feed rate to RESTORE FEEDRATE and returns.

Figure 16:
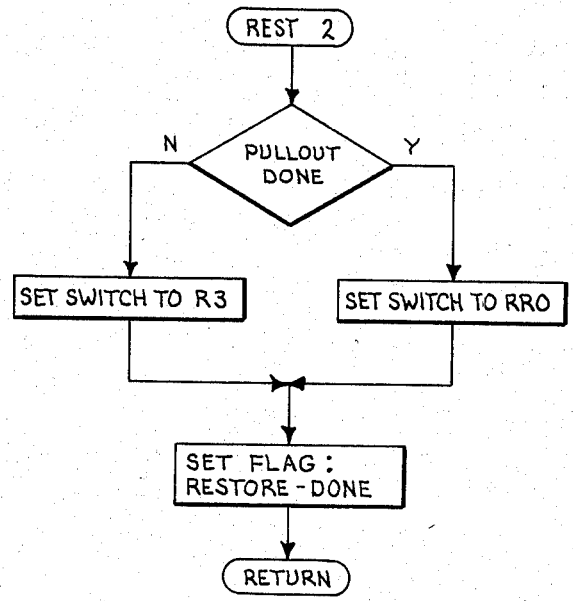

The REST 2 routine shown in FIG. 16 is primarily a decisional routine which determines whether pullout was done when TRP was activated and if so, sets the switch to the RR0 position. If no pullout was done, the switch is set to the R3 position. After setting the switch, the REST 2 routine then sets the RESTORE DONE flag and exits. The RESTORE DONE flag is set in order to force a feedhold condition just prior to the tool making contact with the workpiece, i.e., at the minimum offset distance. The operator must release the feedhold condition which will then cause re-entry to ENTER TRP at either REST 3 or RETRACT REST (or RR0) position.

Figure 17:
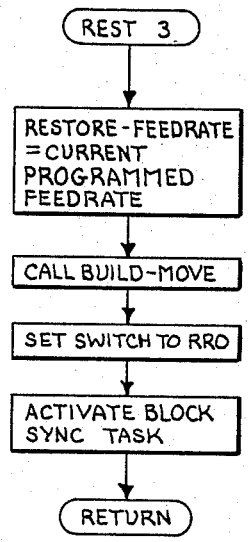

FIG. 17 illustrates the REST 3 routine which is utilized first to set RESTORE FEEDRATE to the current programmed feed rate. The routine thereafter calls the BUILD MOVE routine which establishes the remaining single axis move to the work surface. The routine then sets the switch to the RR0 (RETRACT RESTORE) position and activates the BLOCK SYNC task before exiting.

Figure 18:
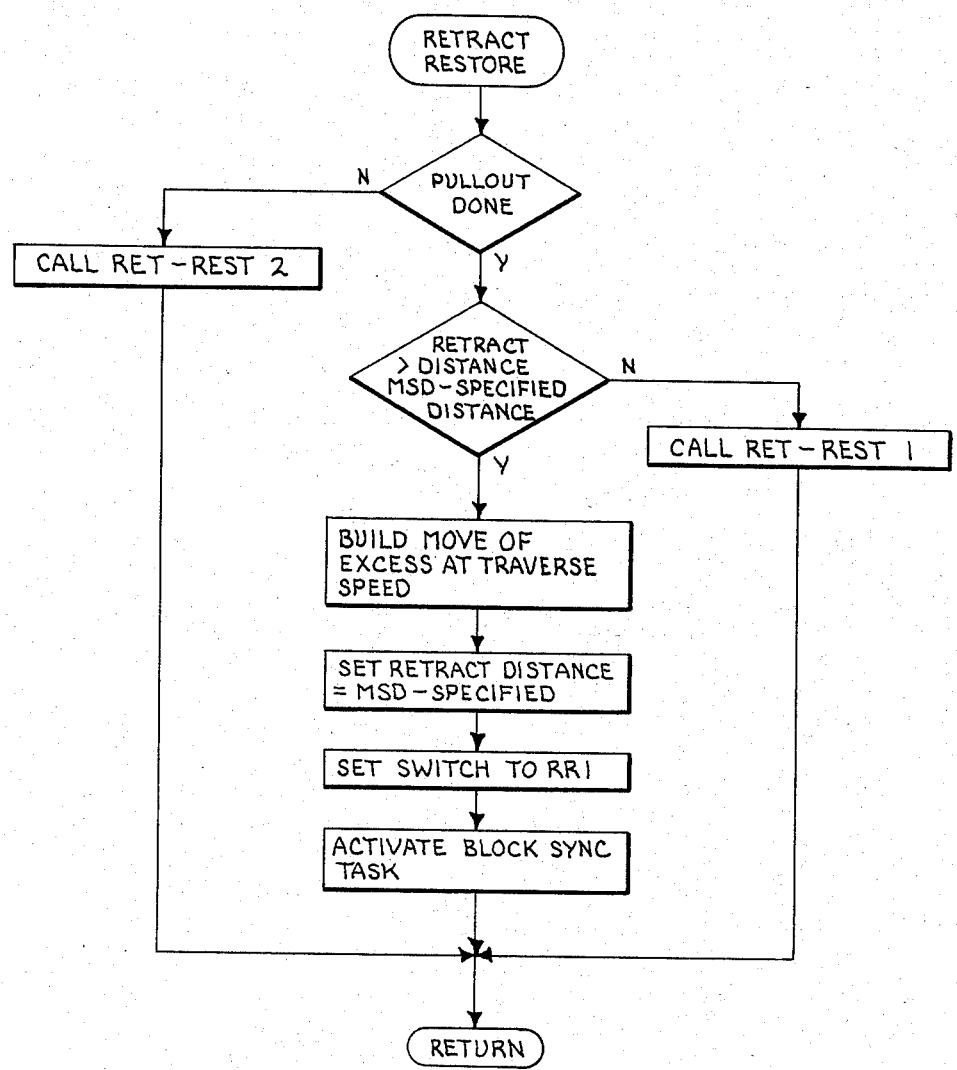

The RETRACT RESTORE (RR0) routine is illustrated in FIG. 18. If no pullout was done at the time that the tool was moved from the workpiece, the RR0 routine immediately calls the RET REST 2 routine. If a pullout was performed, the RR0 routine determines whether the retract distance is greater or less than the minimum offset distance. If retract distance is less than or equal to minimum offset, then RETRACT RESTORE 1 (RET REST 1) is called immediately. If the retract distance is greater than the minimum offset distance, then a move is built consisting of the excess distance beyond the minimum offset distance and that move is retraced at traverse speed. The retract distance is then set to the minimum offset distance and the switch is set to the RR1 position. BLOCK SYNC is activated to call the next task in the TRP routine.

Figure 19:
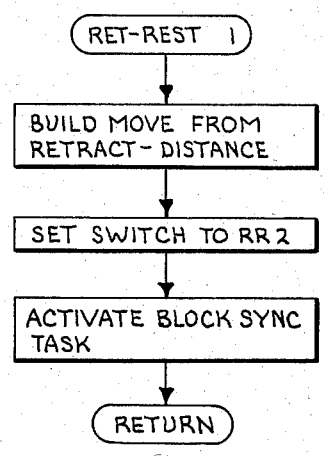

Referring to FIG. 19, the RET REST 1 (RETRACT RESTORE 1) routine is illustrated. This routine builds a move from the retract distance, sets the switch to the RR2 position and activates the BLOCK SYNC task.

Figure 20:
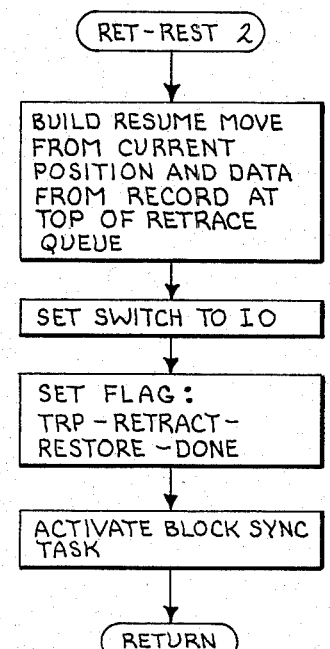
Figure 21:
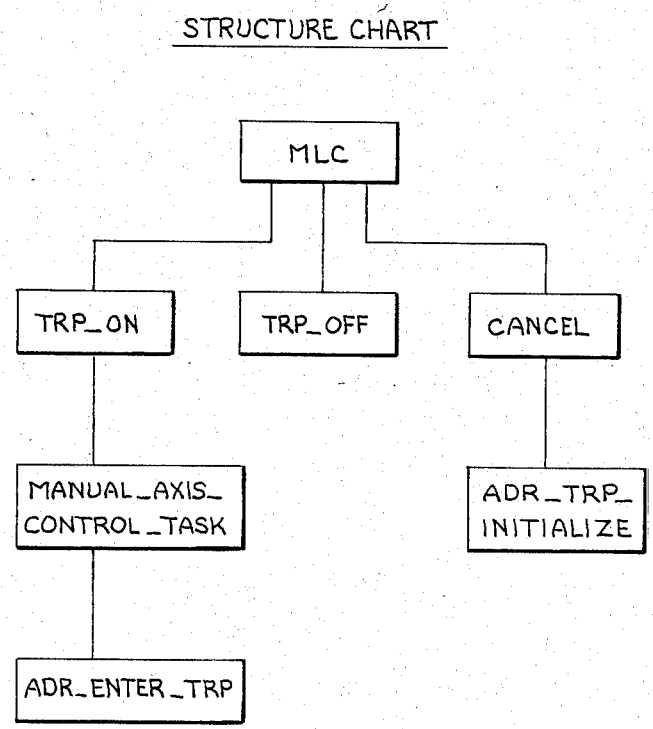

In FIG. 20, the RR2 position, i.e., the RET REST 2 routine, is shown. This routine calculates the distance to the end of the current active data block from the present position. The routine also resets the TRP function by setting the switch to the IO position. It also sets the TRP RETRACT RESTORE DONE flag so that the TRP completion light is turned off and activates the BLOCK SYNC task so that the control may return to the normal operative system program.

Although the particular implementation of the invention as disclosed herein has been presented in a form useable in a Mark Century 2000 CNC, it will be apparent that the implementation can be easily adapted for use in other CNC systems by those having ordinary skill in the art. Instruction manuals, part programming manuals and maintenance for the Mark Century 2000 CNC describe in more detail the incorporation of this invention into a CNC system and also provide additional description of hardware for the system. The appended claims are therefore intended to cover and embrace any modifications of the invention, subject only to the true spirit and scope of the claims.

I claim:

1. A method for interrupting a machine operation in a computer numerical control (CNC) system in which the CNC is programmed to position a cutting tool with respect to a workpiece such that relative motion between the tool and workpiece wil allow the workpiece to be machined to a desired configuration, the program defining a start point for the machining operation, the CNC system including input means for receiving an interrupt command, said method comprising in response to an interrupt command, the steps of:
   (a) determining whether the system is operating in a threadcutting mode;
   (b) providing, if in a threadcutting mode, a first command to cause the cutting tool to pull out from the workpiece while continuing motion in the direction of threadcutting;
   (c) providing, if not in a threadcutting mode, an abort command to terminate all machining operations; and
   (d) generating a pull-out command to cause the tool to exit the workpiece.

2. The method of claim 1 wherein in step (b) a pull-out rate is established in response to the interrupt command for causing the cutting tool to pull out at a rate greater than the normal pull-out rate.

* * * * *